United States Patent
Wanami et al.

(10) Patent No.: US 7,239,950 B2
(45) Date of Patent: Jul. 3, 2007

(54) PASSENGER DETECTION DEVICE

(75) Inventors: Shingo Wanami, Kariya (JP); Satoshi Goshima, Tokyo (JP); Masami Handa, Tokyo (JP); Hideyuki Karasawa, Tokyo (JP)

(73) Assignees: Denso Corporation, Kariya (JP); Fuji Jukogyo Kabushiki Kaisya, Tokyo (JP)

( * ) Notice: Subject to any disclaimer, the term of this patent is extended or adjusted under 35 U.S.C. 154(b) by 79 days.

(21) Appl. No.: 11/057,558

(22) Filed: Feb. 17, 2005

(65) Prior Publication Data

US 2005/0187686 A1 Aug. 25, 2005

(30) Foreign Application Priority Data

Feb. 20, 2004 (JP) ............................. 2004-044541

(51) Int. Cl.
*G06F 17/00* (2006.01)

(52) U.S. Cl. ..................... 701/45; 340/667; 340/666; 340/665

(58) Field of Classification Search ................. 701/45; 340/667, 666, 665
See application file for complete search history.

(56) References Cited

U.S. PATENT DOCUMENTS

| | | | |
|---|---|---|---|
| 6,563,429 B2 * | 5/2003 | Sakai et al. ................. 340/667 |
| 6,759,604 B2 * | 7/2004 | Ishida et al. ................ 177/144 |
| 6,921,108 B2 * | 7/2005 | Kojima et al. ............. 280/735 |
| 7,032,700 B2 * | 4/2006 | Sakai et al. ................. 180/273 |
| 2004/0143382 A1 * | 7/2004 | Ishida ......................... 701/36 |

* cited by examiner

*Primary Examiner*—Thomas Black
*Assistant Examiner*—Marie A Weiskopf
(74) *Attorney, Agent, or Firm*—Posz Law Group, PLC

(57) ABSTRACT

A passenger detection device for a vehicle is provided with multiple load sensors, each of which detects a load on a seat of the vehicle within a predetermined detection range of the load sensor, and an ECU that determines passenger information of the seat. The ECU has at least one calculation range, each of which limits the detection range of each corresponding one of the multiple load sensors. The ECU determines the passenger information based on a detection data value of each load sensor, which is outputted from the load sensor and falls within the corresponding calculation range of the load sensor.

6 Claims, 8 Drawing Sheets

PASSENGER DETECTION DEVICE

CROSS REFERENCE TO RELATED APPLICATION

This application is based on Japanese Patent Applications No. 2004-44541 filed on Feb. 20, 2004, the disclosure of which is incorporated herein by reference.

FIELD OF THE INVENTION

The invention relates to a passenger detection device for providing information of passengers in a vehicle and sending corresponding signal to a passenger protection device (e.g., airbag device or seatbelt) and an alarm device which gives a seatbelt-wear indication.

BACKGROUND OF THE INVENTION

Generally, a passenger detection device is used for providing information of passengers on seats of a vehicle. Referring to JP-2003-14528-A, for example, the passenger detection device includes multiple load sensors and a passenger detection electronic control unit (ECU), in which at least one passenger detection threshold value is memorized. Based on the passenger detection threshold value, the passenger information can be determined.

Specifically, by comparing a total of detection data of the multiple load sensors with the two passenger detection threshold values, it is determined whether or not the seat is vacant, or whether or not the passenger on the seat is analdlult. When the total is smaller than the passenger detection threshold value for a child-vacancy judgment, the passenger detection ECU determines that the seat is vacant. On the other hand, when the total is larger than or equal to the passenger detection threshold value for the child-vacancy judgment, and smaller than the passenger detection threshold value for a child-adult judgment, the passenger detection ECU determines that the passenger is a child. When the total is larger than or equal to the passenger detection threshold value for the child-adult judgment, the passenger detection ECU determines that the passenger is an adult. In the case where the seat is vacant or the passenger is a child, an airbag corresponding to this seat will be restricted from deploying. In contrast, when the passenger is an adult, the airbag can be activated. Furthermore, when the passenger having been determined to be an adult does not wear a seatbelt, a seatbelt-wear alarm is given.

However, a vacancy zero point (detection load for vacant seat) of the load sensor is readily influenced by errors of both an attachment of the load sensor to the seat and an attachment of the seat, at which the load sensors having been mounted, to the vehicle. Therefore, there is a variation in the vacancy zero points of the multiple load sensors mounted at the seat.

FIG. 8A shows the variation in the vacancy zero points of the load sensors a1-d1. The load sensors a1 and b1 are mounted at the two front corners of the seat, and the load sensors c1 and d1 are mounted at the two rear corners of the seat. Here, a sensor detection range is an inherent dynamic range of the load sensor. A zero-point variation range is a range of the vacancy zero points which is admissible to be input to a passenger detection ECU considering the variation in the vacancy zero points. In FIG. 8A, (+) indicates a plus direction (downward direction) of the load, and (−) indicates a minus direction of the load (upward direction). Referring to FIG. 8A, the vacancy zero points of the four load sensors a1-b1 are dispersed at the plus side and the minus side.

When a passenger sits on the seat, a1-d1 ownward load is additionally exerted on the seat, so that each of the load sensors a1-d1 has a plus-side detection load in addition to the vacancy zero point thereof, as shown in FIG. 8B.

When the vehicle is accelerated or decelerated, the load exerted on the seat will be changed. FIG. 8C shows the detection loads of the load sensors a1-d1 when the vehicle is accelerated. As compared with FIG. 8B, the detection loads of the load sensors a1, b1, c1, d1 indicted in FIG. 8C are respectively moved toward the minus side by $\Delta fa$, the minus side by $\Delta fb$, the plus side by $\Delta Fc$ and the plus side by $\Delta Fd$.

Because the vacancy zero points of the load sensors a1 and b1 are originally near a lower limit of the vacancy zero point variation range, the detection loads of the load sensor a1 and b1 exceed a lower limit of the sensor detection range. As shown in FIG. 8C, the exceeding parts of the detection loads are eliminated, so that the detection loads are limited within the sensor detection range. Therefore, the real load exerted on the seat cannot be detected by the load sensors a1-d1. Specifically, as compared with FIG. 8B, the detection load of the load sensor a1 has a minus-side movement value $\Delta fa$, while the real minus-side movement value is $(\Delta fa+\Delta fa')$. Similarly, the detection load of the load sensor b1 has a minus-side movement value $\Delta fb$, while the real minus-side movement value is $(\Delta fb+\Delta fb')$. On the other hand, the detection loads of the load sensors c1 and d1 does not exceed the sensor detection range to be the loads exerted on the corresponding portions of the seat. Therefore, an actual total of the detection loads of the load sensors a1-d1 is $(\Delta fc+\Delta fd-\Delta fa-\Delta fb)$, instead of the real total $(\Delta fc+\Delta fd-\Delta fa-\Delta fb-\Delta fa'-\Delta fb')$. That is, $(-\Delta fa'-\Delta fb')$ is not added to the actual total, so that the actual total of the detection loads of the load sensors a1-d1 is larger than the load exerted on the seat.

Therefore, the actual total of the detection loads is changed from the minus side toward the plus side. If the total exceeds the passenger judgment threshold value, a judgment result of the passenger information, which is determined by the passenger detection ECU before the vehicle is accelerated, will be switched from "child" to "adult" even when the passenger is actually a child.

When the vehicle is turned while being accelerated, a load in the plus side will be centralized at one of the four load sensors. FIG. 9A shows loads detected in an ordinary traveling of the vehicle. FIG. 9B shows loads detected when the vehicle is turned while being accelerated. Here, the load beyond the upper limit of the sensor detection range is centralized at the load sensor d1 among the load sensors c1 and d1 which are mounted at the vehicle rear portion. In this case, the exceeding part $\Delta fd'$ at the plus side is eliminated from the detection load, so that the detection load of the load sensor d1 is limited within the sensor detection range. Thus, the total of the detection loads of the load sensors a1-d1 will be smaller than the load exerted on the seat.

Therefore, the total of the detection loads of the load sensors a1-d1 is changed from the plus side toward the minus side. If the total exceeds the passenger judgment threshold value, the judgment result of the passenger information, which is determined by the passenger detection ECU before the vehicle is turned, will be switched from "adult" to "child" or "vacancy" even when the passenger is actually an adult.

SUMMARY OF THE INVENTION

In view of the above disadvantages, it is an object of the present invention to provide a passenger detection device for a vehicle, which determines passenger information with a high and stable detection accuracy regardless of an influence of a vehicle acceleration or the like.

According to the present invention, a passenger detection device for a vehicle is provided with a plurality of load sensors, each of which detects a load on a seat of the vehicle within a predetermined detection range of the load sensor, and an ECU that determines passenger information of the seat. The ECU has at least one calculation range, each of which limits the detection range of each corresponding one of the plurality of load sensors. The ECU determines the passenger information based on a detection data value of each load sensor, which is outputted from the load sensor and falls within the corresponding calculation range of the load sensor.

As above described with reference to FIG. 8C, a total of detection loads of the load sensors is larger than the load exerted on the seat, because vacancy zero points of the load sensors a1 and b1 are originally near a lower limit of a vacancy zero point variation range. According to the present invention, the ECU is set to have the calculation range for limiting the detection range of the load sensors, so that only the detection data of the load sensors within the calculation range are used for a calculation of the load exerted on the seat. Accordingly, not only the load sensors a1 and b1 but also the load sensors c1 and d1 have parts of the detection loads not to be used for the calculation, so that the uncalculated parts at a plus side are offset with and those at a minus side. Accordingly, a judgment accuracy of the passenger information is improved.

Preferably, the at least one calculation range of the ECU includes at least two kinds of calculation ranges to correspond with a variation in the load applied to the respective load sensors.

Generally, the shape of the seat is set to make the passenger thereon easy to rest against the back of the seat. Therefore, a load in the minus side is easier to be exerted at the load sensors at the seat front portion than a load in the plus side. In contrast, the load in the plus side is easier to be exerted at the load sensors at the seat rear portion than the load in the minus side. Therefore, if the calculation range for the load sensors at the seat front portion is the same with that for the load sensors at the seat rear portion, the detection loads of the load sensors at the seat front portion are easy to exceed the lower limit of the calculation range, and the detection loads of the load sensors at the seat rear portion are easy to exceed the upper limit of the calculation range.

In this case, for example, the lower limit of the calculation range for the load sensors at the seat front portion can be lowered toward the minus side, and the upper limit of the calculation range for the load sensors at the seat rear portion can be heightened toward the plus side. Thus, it is difficult for the detection load to exceed both the lower and upper limits of the calculation range. Accordingly, the judgment accuracy of the passenger information can be improved. The calculation range can be also set corresponding to the individual load sensor.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

In the first embodiment, a passenger detection device 1 for a vehicle will be described with reference to FIGS. 1-4.

Figure 1:
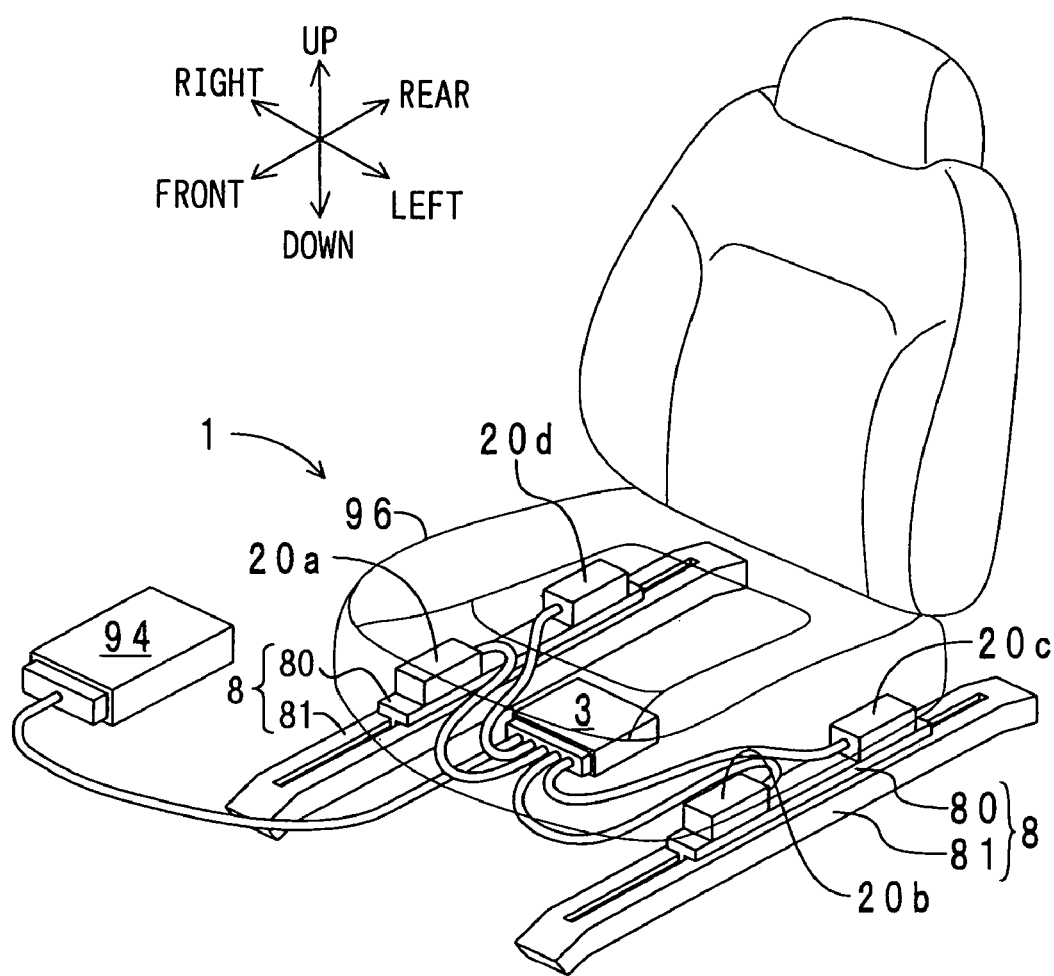
FIG. 1 is a perspective diagram showing a seat at which a passenger detection device is mounted according to a first embodiment of the present invention.

FIG. 1 shows a seat 96 (e.g., assistant seat), at which the passenger detection device 1 including load sensors 20a-20d and a passenger detection ECU 3 is mounted. Two rails 8 are arranged under the seat 96 to be parallel with each other with respect to a vehicle width (right-left) direction. Each of the rails 8 includes an upper rail 80 and a lower rail 81. The lower rail 81 is fixed on a floor (not shown) of the vehicle. The upper rail 80 is mounted on the lower rail 81 to be slideable in a vehicle longitudinal (front-rear) direction along the lower rail 81. Thus, the seat 96 is slideable together with the upper rail 80 in the vehicle front-rear direction.

The load sensors 20a-20d, being disposed between the seat frame (not shown) of the seat 96 and the upper rail 80, are provided at the right front portion, the left front portion, the left rear portion and the right rear portion, respectively, of the seat 96. Detection directions of the load sensors 20a-20d are arranged corresponding to an up-down direction shown in FIG. 1. In this case, the right-left direction is defined with respect to a traveling direction of the vehicle.

The load sensors 20a-20d are respectively communicated with the passenger detection ECU 3 through, for example, a wire harness (not shown). The passenger detection ECU 3 is fixed at the reverse surface of the seat 96 and communicated with an airbag ECU 94, which is buried under an instrument panel (not shown) of the vehicle through a wire harness (not shown) or the like.

Figure 2:
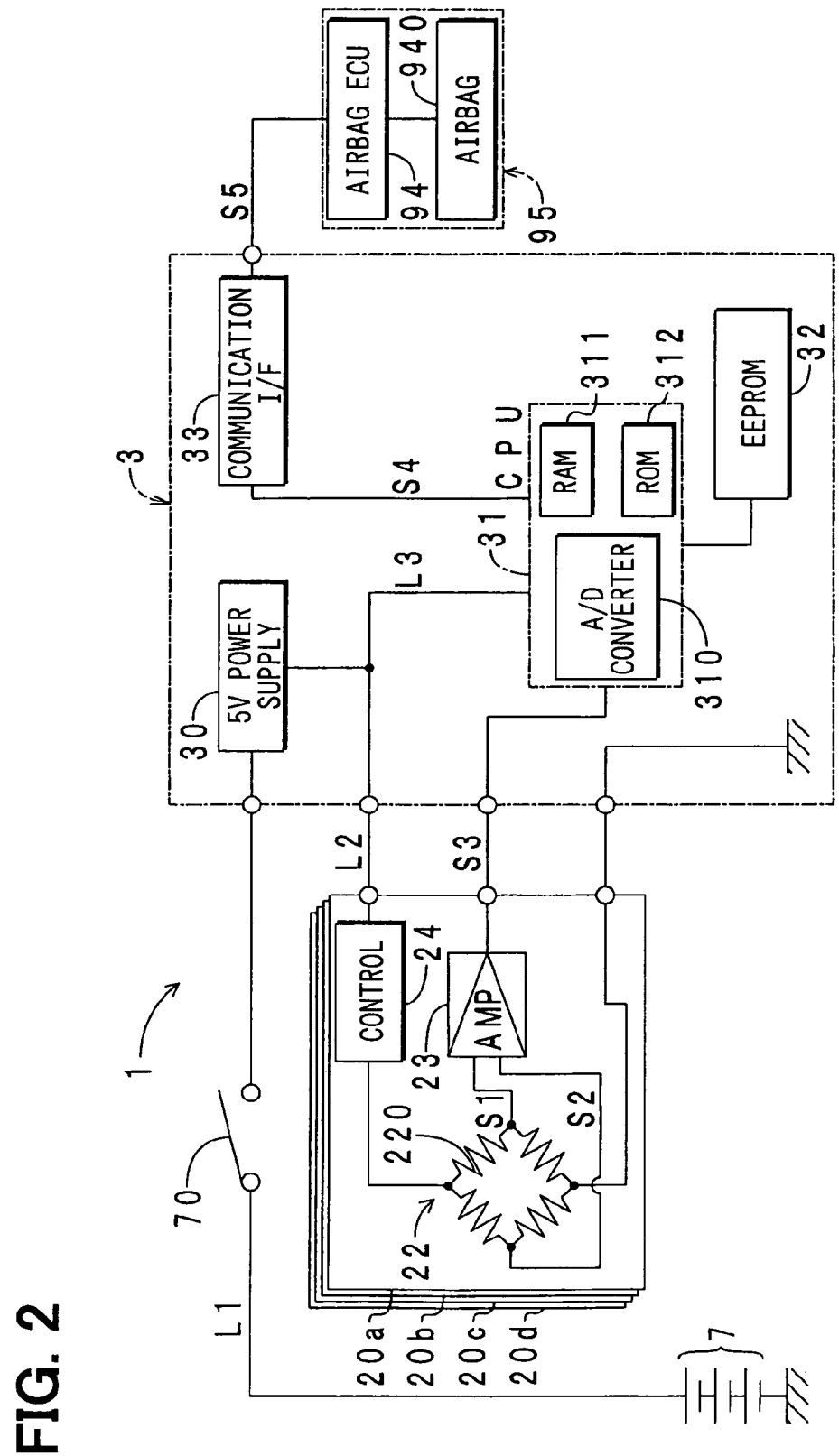
FIG. 2 is a block diagram of the passenger detection device shown in FIG. 1.

FIG. 2 shows the composition of the load sensors 20a-20d and the passenger detection ECU 3. The load sensor 20a is provided with a gauge portion 22, an amplifier 23 (AMP) and a control portion 24, which are the same with those construct the load sensor 20b, 20c or 20d. The gauge portion 22 includes four strain gauges 220 which construct a bridge circuit. The AMP 23 amplifies a voltage value output from the gauge portion 22. The control portion 24 adjusts the slope and intercept of the voltage values so that the AMP 23 has an aimed linear output characteristic.

The passenger detection ECU 3 includes a 5V power supply 30, a central processing unit 31 (CPU), an electrically erasable programmable read-only memory 32 (EEPROM), and a communication interface 33 (communication I/F). The CPU 31 is provided with an A/D converter 310, a RAM 311 and a ROM 312 in which a program for a passenger judgment procedure is memorized beforehand. The analog voltage value generated by the AMP 23 is input to the A/D converter 310 to be converted into a digital voltage value. The digital voltage value will be temporarily memorized in the RAM 311. The EEPROM 32 is provided for memorizing the content of a failure of the load sensors 20a-20d, for example. Data memorized in the EEPROM 32 can be updated. That is, the previous data memorized in the EEPROM 32 can be replaced by the current data. The communication I/F 33 is provided for sending a judgment result of passenger information having been determined by the CPU 31 to the airbag ECU 94 of an airbag unit 95.

The 5V power supply 30 is connected to a vehicle battery 7 through an ignition switch 70. When the ignition switch 70 is turned on, the vehicle battery 7 supplies a 12V voltage to the 5V power supply 30 through a power cord L1. Then, the 5V power supply 30 converts the voltage from 12V into 5V, and thereafter supplying the 5V voltage to the load sensors 20a-20d and the CPU 31 through power cords L2 and L3, respectively. Thus, a predetermined voltage is supplied to the strain gauges 220 of the gauge portion 22.

Next, the signal transmission in the passenger detection device 1 will be described.

When a load from the right front portion of the seat 96 is applied at the load sensor 20a, resistances of the strain gauges 220 thereof will vary, so that the bridge circuit unbalances to generate a little voltage, which is supplied to the gauge portion 22. The voltage value of the gauge portion 22 is sent to the AMP 23 through signal cords S1, S2 to be amplified. Then, the analog voltage value having been amplified is sent to the A/D converter 310 of the CPU 31 through a signal cord S3. The A/D converter 310 converts the analog voltage value into a corresponding digital voltage value. Similarly, analog voltage values from the load sensors 20b, 20c and 20d due to loads exerted at corresponding attachment positions of the seat are also input to the A/D converter 310 to be converted into corresponding digital voltage values.

The digital voltage values of the load sensors 20a-20d are temporarily memorized in the RAM 311, and thereafter sent to the CPU 31 to be processed (added) therein. The calculation procedure will be described later. A total of the digital voltage values of the four load sensors 20a-20d will be compared with a passenger judgment threshold value, so that passenger information is determined by the CPU 31. Specifically, when the total is smaller than or equal to a vacancy threshold value $W_{th1}$ (passenger judgment threshold value for vacancy judgment), it is determined that the seat 96 is vacant. When the total is larger than the vacancy threshold value $W_{th1}$, and smaller than or equal to an adult-child threshold value $W_{th2}$ (passenger judgment threshold value for adult-child judgment), it is determined that the passenger is a child. Here, $W_{th2}$ is larger than $W_{th1}$. When the total is larger than the adult-child threshold value $W_{th2}$, it is determined that the passenger is an adult.

Then, the judgment result of the passenger information is input to the airbag ECU 94 through the signal cord S4, the communication I/F 33 and the signal cord S5. Corresponding to the passenger information, the airbag ECU 94 sends a demand to an airbag 940. Thus, the airbag 940 will be restricted from deploying when it is determined that the seat 96 is vacant or the passenger is a child. On the other hand, the airbag 940 will be activated when it is determined that the passenger is an adult.

With reference to FIG. 3 and FIGS. 4A-4C, the calculation procedure of the passenger detection ECU 3 will be described.

Figure 4A:
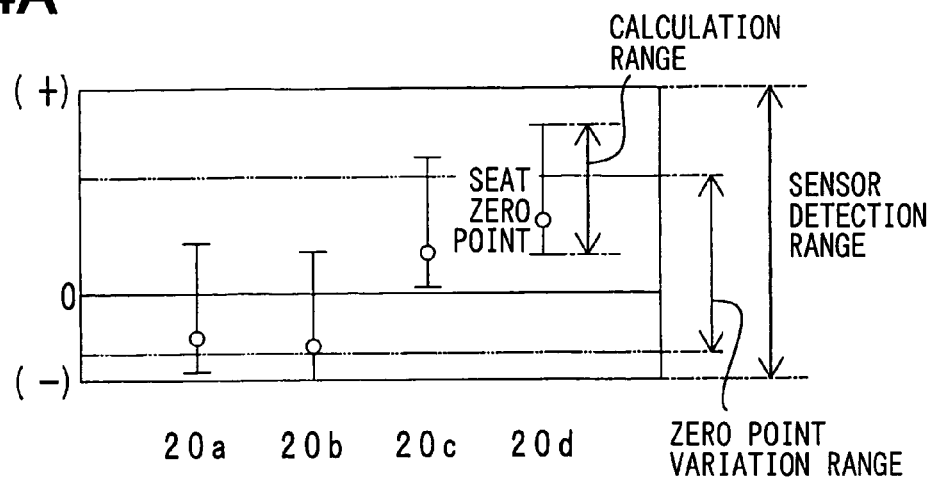
FIG. 4A, FIG. 4B and FIG. 4C are graphs showing a calculation method of the passenger detection device shown in FIG. 1.

A variation in vacancy zero points of the load sensors 20a-20d mounted at four corners of the seat 96 is shown in FIG. 4A, in which a sensor detection range is an inherent dynamic range of the load sensor. A zero point variation range is a range of the vacancy zero points which is admissible to be input to the passenger detection ECU 3 considering the variation in the vacancy zero points.

In FIG. 4A, (+) indicates a plus side (downward direction) of the load exerted on the seat 96, and (−) indicates a minus side (upward direction) of the load. The vacancy zero points of the four load sensors 20A-20D are disposed at both the plus side and the minus side. A calculation range of the EEPROM 32 of the passenger detection ECU 3 is set to have a predetermined width from the plus side of the vacancy zero point to the minus side thereof. The calculation ranges of the EEPROM 32 for each of the load sensors 20a-20d is set to have a same width.

Figure 4B:
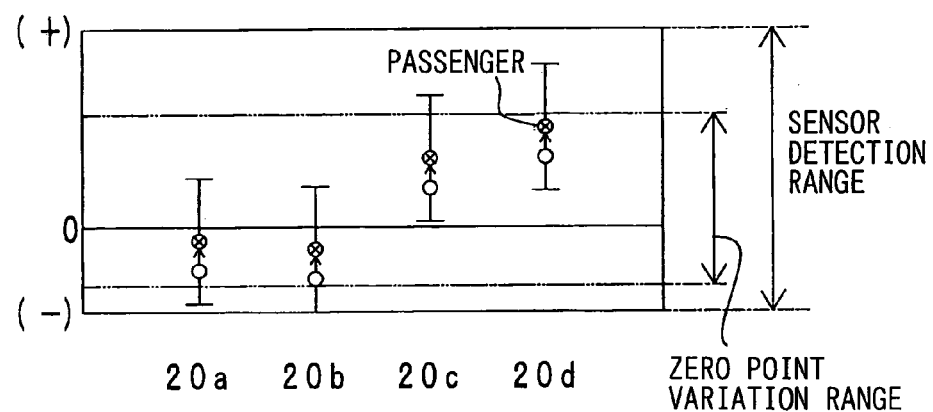
Figure 4C:
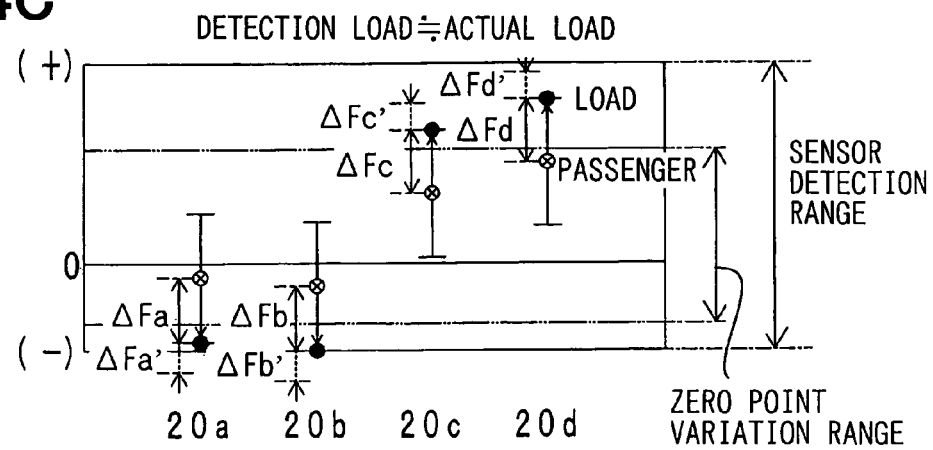

When a passenger sits on the seat 96, a downward load is additionally exerted on the seat 96 referring to FIG. 4B. Thus, loads in the plus side will be detected by the load sensors 20a-20d in addition to the vacancy zero points thereof.

Figure 3:
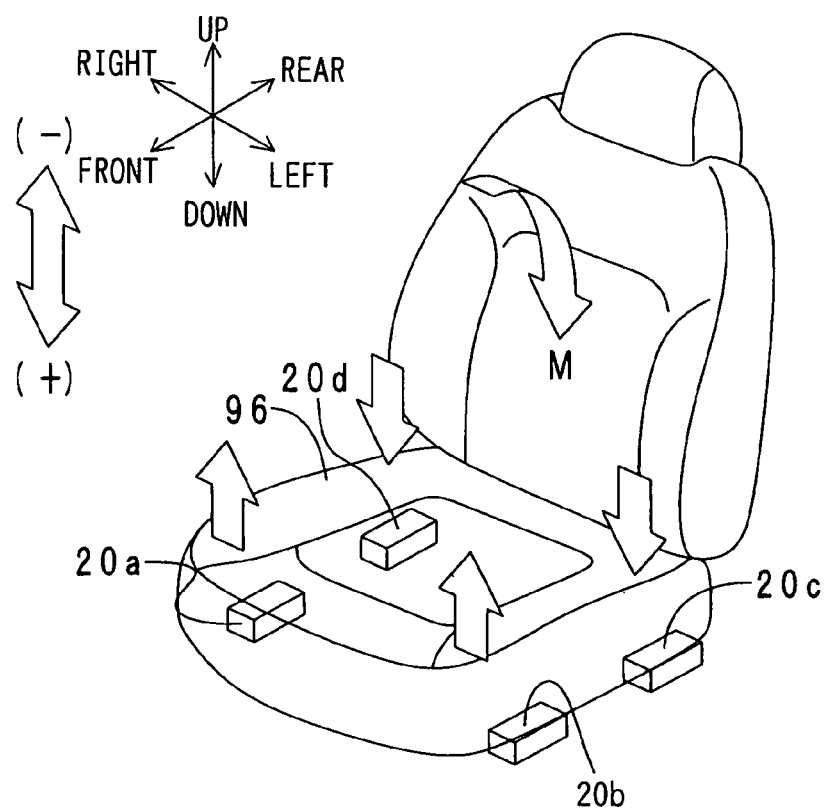
FIG. 3 is a schematic diagram showing the seat at which the passenger detection device shown in FIG. 1 is mounted.

When the vehicle is accelerated, the load exerted on the seat 96 will be changed. The case where the vehicle is accelerated is shown in FIG. 3, in which (+) and (−) are same set as shown in FIG. 4A. In this case, a force moment M is applied at the seat 96. An upward force is additionally exerted on the right front portion of the seat 96. Therefore, the detection load of the load sensor 20a indicted in FIG. 4C moves toward the minus side by ΔFa with respect to that indicated in FIG. 4B. Moreover, an upward force is additionally exerted on the left front portion of the seat 96, so that the detection load of the load sensor 20b indicted in FIG. 4 moves toward the minus side by ΔFb with respect to that indicated in FIG. 4B. A downward force is additionally exerted on the left rear portion of the seat 96, so that the detection load of the load sensor 20c indicted in FIG. 4C moves toward the plus side by ΔFc with respect to that indicated in FIG. 4B. Furthermore, a downward force is additionally exerted on the right rear portion of the seat 96, so that the detection load of the load sensor 20d indicted in FIG. 4C moves toward the plus side by ΔFd with respect to that indicated in FIG. 4B.

In this case, the detection loads of the load sensor 20a and 20b are a lower limit value of the calculation range. That is, the detection load is limited within the calculation range. Accordingly, for the load sensor 20a, ΔFa' is eliminated from the detection load of the load sensor 20a, while (ΔFa+ΔFa') is a real load exerted at the load sensor 20a due to the vehicle acceleration. That is, only ΔFa will be used for the calculation of the load exerted on the seat 96. Similarly, for the load sensor 20b, ΔFb' is eliminated from the detection load of the load sensor 20b, while (ΔFb+ΔFb') is a real load exerted at the load sensor 20b due to the vehicle acceleration. That is, only ΔFb will be used for the calculation of the load exerted on the seat 96.

Moreover, the detection loads of the load sensors 20c and 20d are an upper limit value of the calculation range. That is, the detection loads are limited within the calculation range. Accordingly, ΔFc' is eliminated from the detected load of the load sensor 20c, while (ΔFc+ΔFc') is a real load exerted at the load sensor 20c due to the vehicle acceleration. That is, only ΔFc will be used for the calculation of the load exerted on the seat 96. Similarly, ΔFd' is eliminated from the detected load of the load sensor 20d, while (ΔFd+ΔFd') is a real load exerted at the load sensor 20d due to the vehicle acceleration. That is, only ΔFd will be used for the calculation of the load exerted on the seat 96.

Therefore, the total of the detection loads (detection data values) of the load sensors 20a-20d to be used in the calculation is (ΔFc+ΔFd−ΔFa−ΔFb), instead of the real total (ΔFc+ΔFd+ΔFc'+ΔFd'−ΔFa−ΔFb−ΔFa'−ΔFb'). That is, (ΔFc'+ΔFd'−ΔFa'−ΔFb') is uncalculated. Thus, the uncalculated parts of the detection loads at the plus side will offset the uncalculated parts at the minus side.

According to the passenger detection device 1, the detection loads (detection data values) of the load sensors 20a-20d are limited within the calculation range of the passenger detection ECU 3. Then, the uncalculated parts of the detection loads at the plus side offset the uncalculated parts at the minus side, thus reducing a detection error of the load exerted on the seat 96. Accordingly, a detection accuracy of the load sensors 20a-20d is improved.

As described above, the variation exists in the vacancy zero points of the load sensors 20a-20d. The variation is generated due to errors of both an attachment of the load sensors 20a-20d to the seat 96 and an attachment of the seat 96, at which the load sensors 20a-20d have been mounted, to the vehicle. That is, the variation is inherent for the seat 96 and different from those of the load sensors mounted at the other seats in the vehicle. Considering that, the ECU 3 of the passenger detection device 1 is set to have the calculation range having the vacancy zero point as a standard point, thus reducing an influence of the variations in the vacancy zero points of the multiple seats on the detection accuracy of the load exerted on the corresponding seat. Then, judgment accuracy of the passenger information of the multiple seats can become more homogeneous.

In this embodiment, the vacancy zero points and the calculation range of the passenger detection device 1 are memorized in the EEPROM 32, and can be updated to correspond to various attachment states of the loads sensors 20a-20d.

Second Embodiment

In the second embodiment, a passenger detection threshold value for the digital voltage value (detection load) of the individual load sensor 20a, 20b, 20c or 20d is memorized in the passenger detection ECU 3 besides that for the total of the digital voltage values of the four load sensors 20a-20d, which is used in the above-described first embodiment. In this embodiment, what is different from the first embodiment will be described referring to FIGS. 5-7.

When the vehicle is turned left while being accelerated, the passenger has accelerations both in the vehicle front-rear direction and the vehicle right-left direction, so that the center of gravity thereof is changed. Thus, the load exerted at the load sensors 20a-20d (indicated with hatching) is changed with reference to FIG. 5. Specifically, the load of the minus side is applied at the load sensors 20a, 20b and 20c, and the load of the plus side is applied at the load sensor 20d. That is, the load, being downward with respect to the seat 96, is centralized on the load sensor 20d.

Figure 6A:
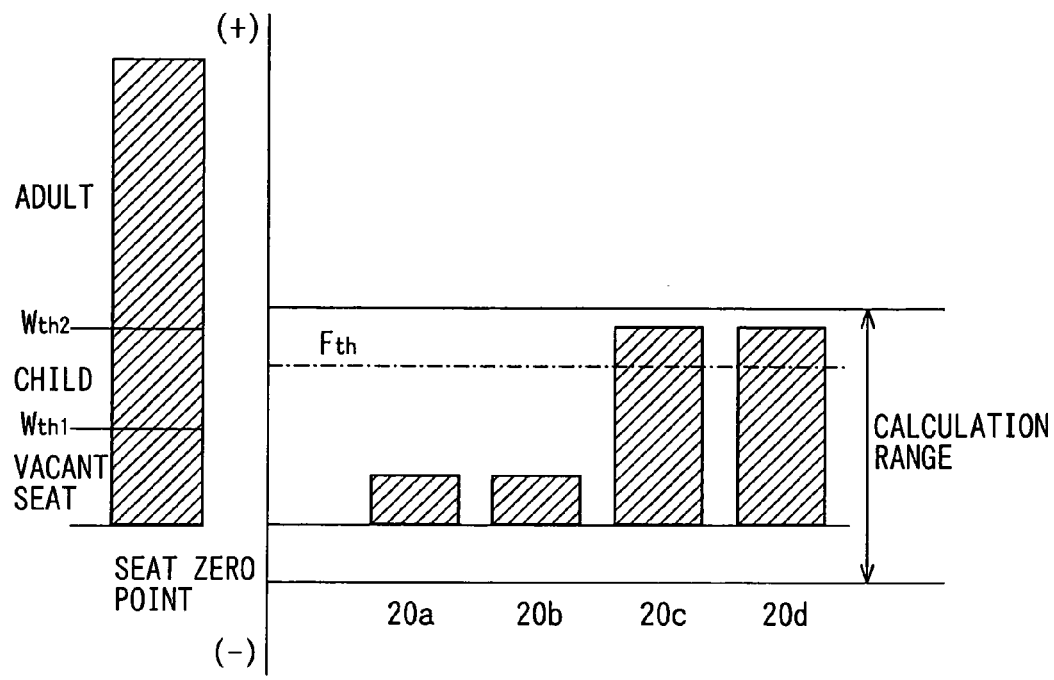
FIG. 6A and FIG. 6B are graphs showing a load variation when the vehicle is turned while being accelerated according to the second embodiment.
Figure 6B:
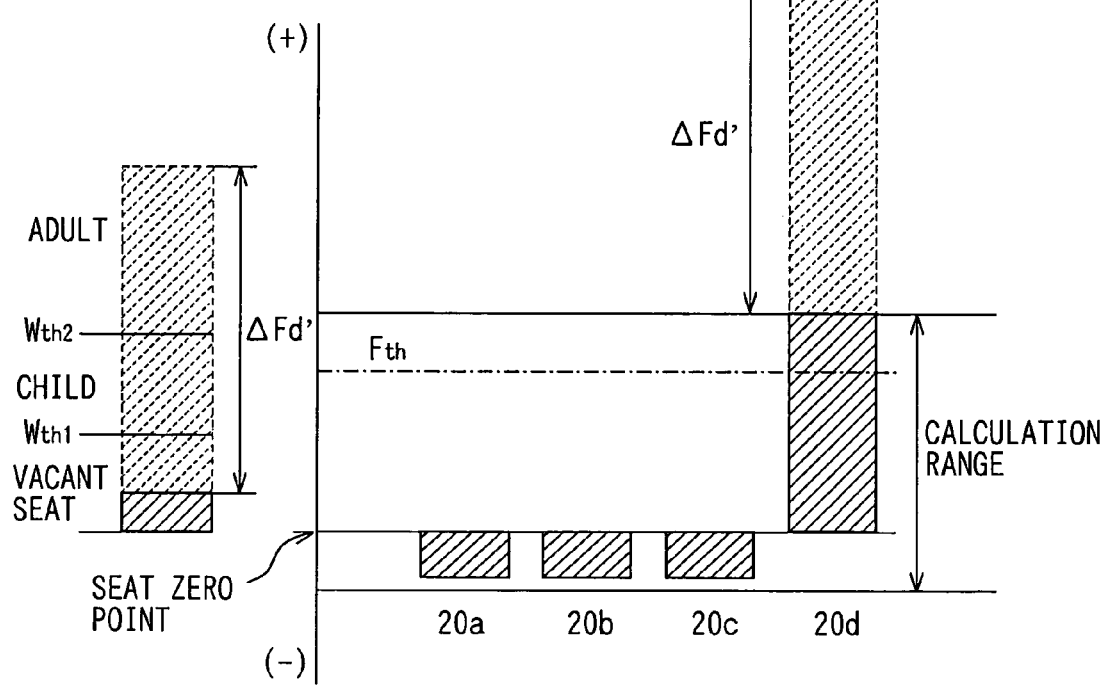

FIG. 6A shows the load detected in an ordinary traveling of the vehicle and FIG. 6B shows the load detected when the vehicle is turned while being accelerated. Here, the load is centralized on the load sensor 20d among the load sensors 20c and 20d, which are mounted at the vehicle rear portion.

In this case, the detection load of the load sensor 20d is beyond the upper limit value of the calculation range, and will be limited within the calculation range. Specifically, the exceeding part ΔFd' at the plus side is eliminated from the detection load of the load sensor 20d. Thus, the detection load within the calculation range is used for the calculation of the load exerted on the seat 96. Thus, after the vehicle is turned while being accelerated, the total of the detection loads of the load sensors 20a-20d is changed from the plus side toward the minus side, as compared with that before the turn along with the acceleration of the vehicle.

Figure 7:
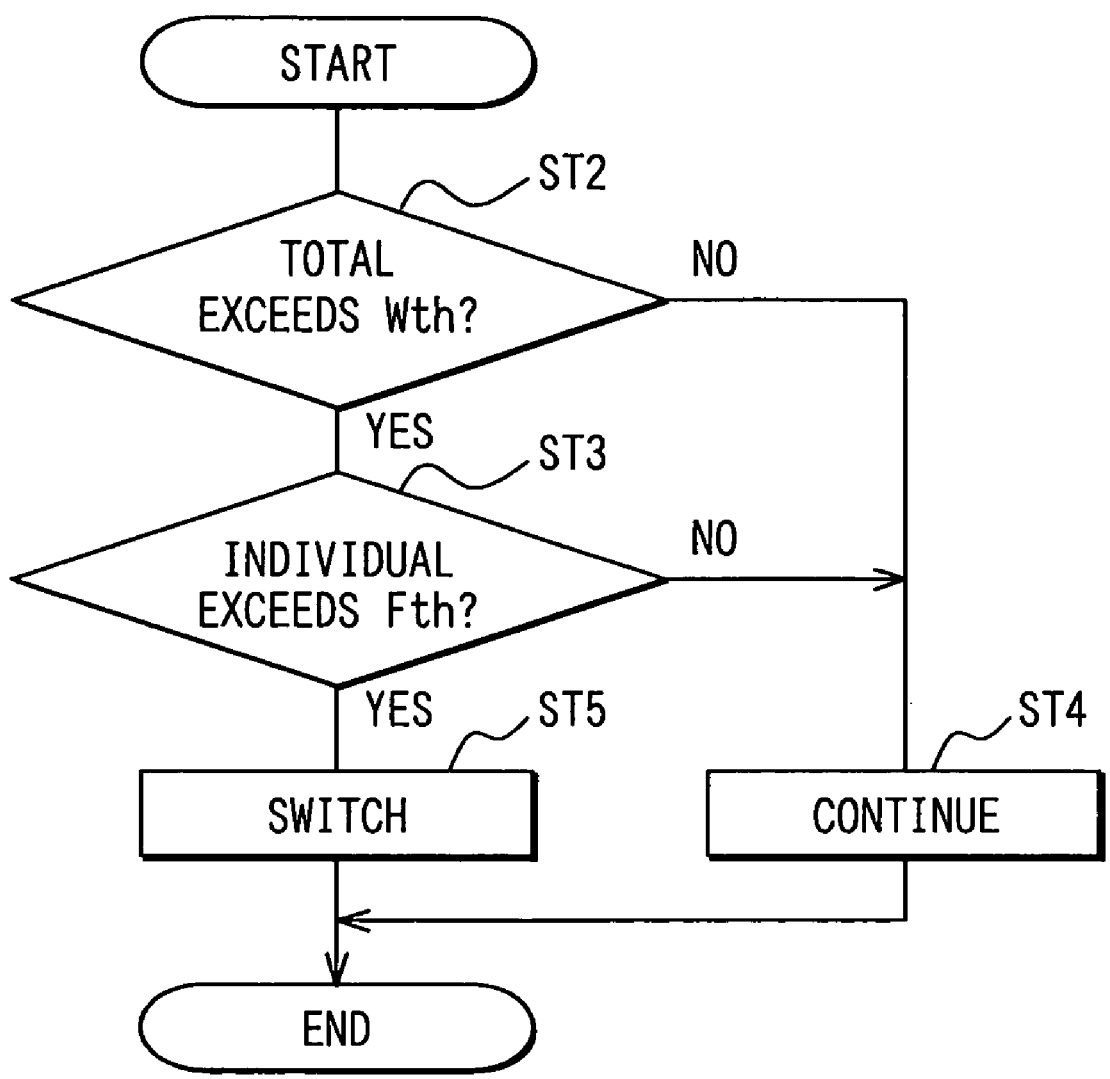
FIG. 7 is a flow diagram showing a passenger judgment procedure by CPU of the passenger detection device according to the second embodiment.
Figure 8A:
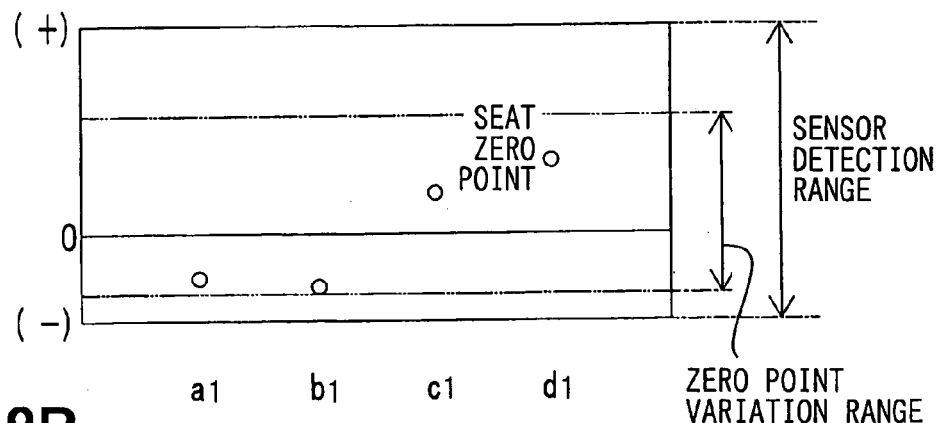
FIG. 8A, FIG. 8B and FIG. 8C are graphs showing a calculation method of a passenger detection device according to a related art.
Figure 8B:
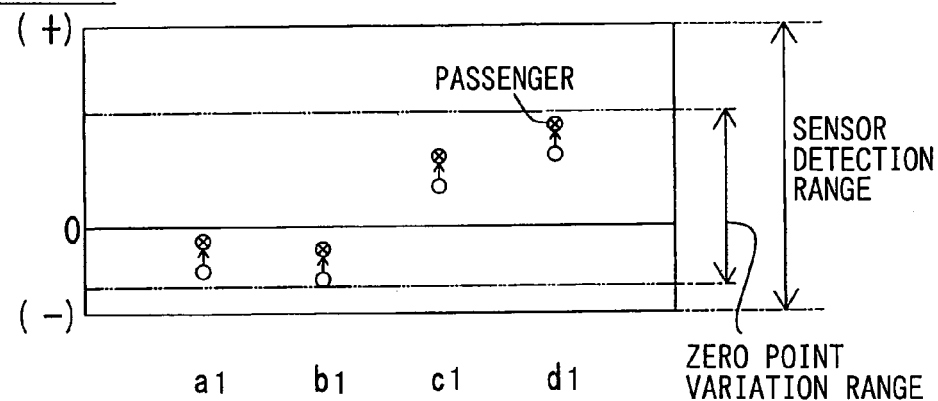
Figure 8C:
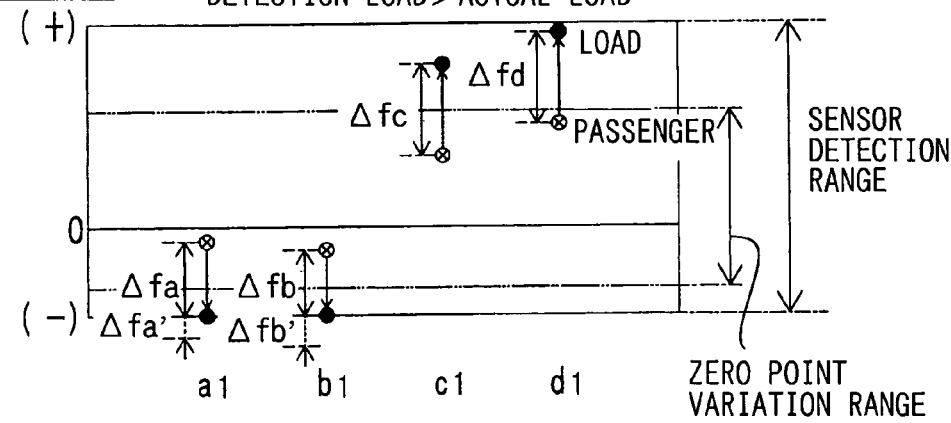
Figure 9A:
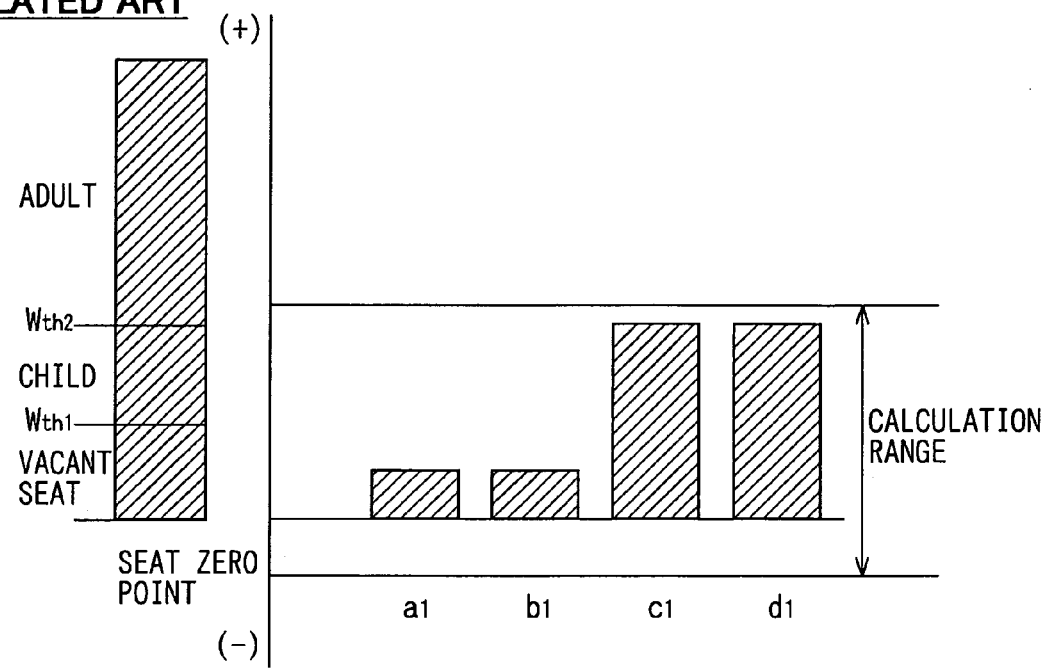
FIG. 9A and FIG. 9B are graphs showing a load variation when a vehicle at which the passenger detection device is mounted is turned while being accelerated according to the related art.
Figure 9B:
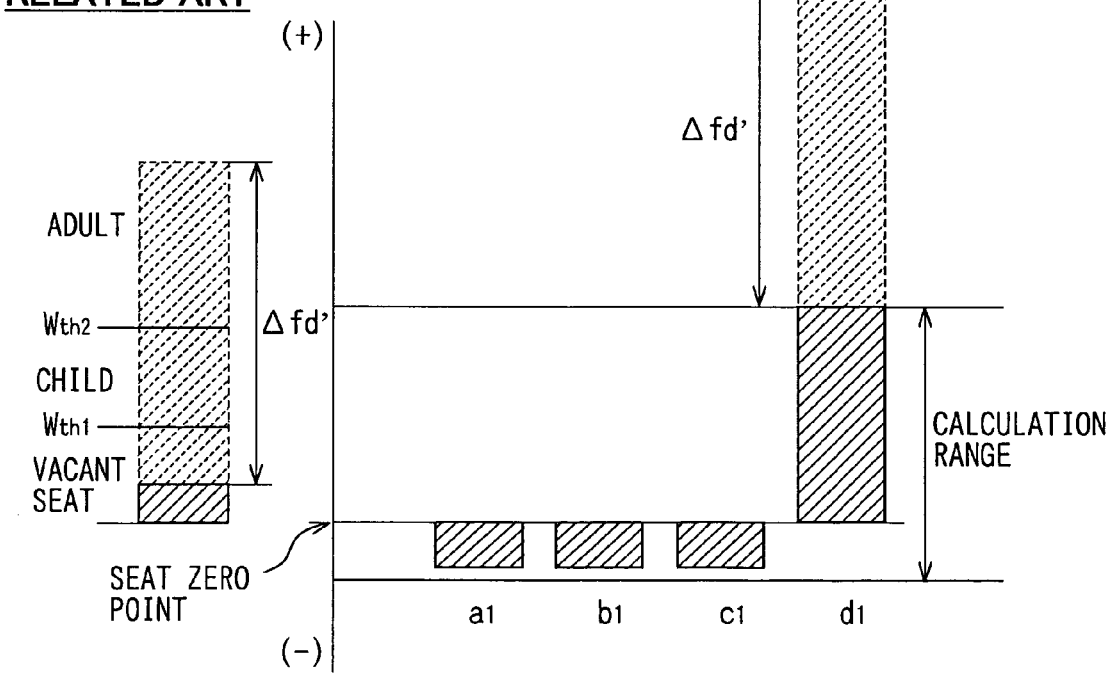

FIG. 7 shows a procedure which is processed by the passenger detection ECU 3 to determine the passenger information. At first, it is determined whether or not the total of the detection loads of the load sensors 20a-20d exceeds the passenger detection threshold value $W_{th1}$ or $W_{th2}$ at step ST2.

When it is determined that the total does not exceed $W_{th1}$ or $W_{th2}$ (ST2: NO), the judgment result of the passenger information having been determined before the turn along with the acceleration will be maintained at step ST4. Thereafter, the procedure is ended.

In contrast, when it is determined that the total exceeds $W_{th1}$ or $W_{th2}$ (ST2: YES), step ST3 will be performed. At step ST3, it is determined whether or not the detection load of the individual load sensor 20d exceeds an individual passenger detection threshold value $F_{th}$.

When it is determined that the detection load of the individual load sensor 20d exceeds $F_{th}$ (ST3: YES), the judgment result of the passenger information having been determined before the turn along the acceleration will be switched at step ST5. At step ST5, for example, the judgment result is switched from "adult", which has been determined before the turn along with the acceleration, to "child" or "vacancy". Thereafter, the procedure is ended.

On the other hand, when it is determined that the detection load of the individual load sensor 20d does not exceed $F_{th}$ (ST3: NO), the judgment result of the passenger information having been determined before the turn along with the acceleration will be maintained at step ST4. For example, it is determined that the passenger is an adult. Thereafter, the procedure is ended.

According to this embodiment, the judgment accuracy of the passenger information can be maintained even when the load is partially centralized on the seat 96.

Third Embodiment

In the third embodiment, the upper limit of the calculation range is used as the individual passenger detection threshold value. What is different from the above-described second embodiment will be described.

Figure 5:
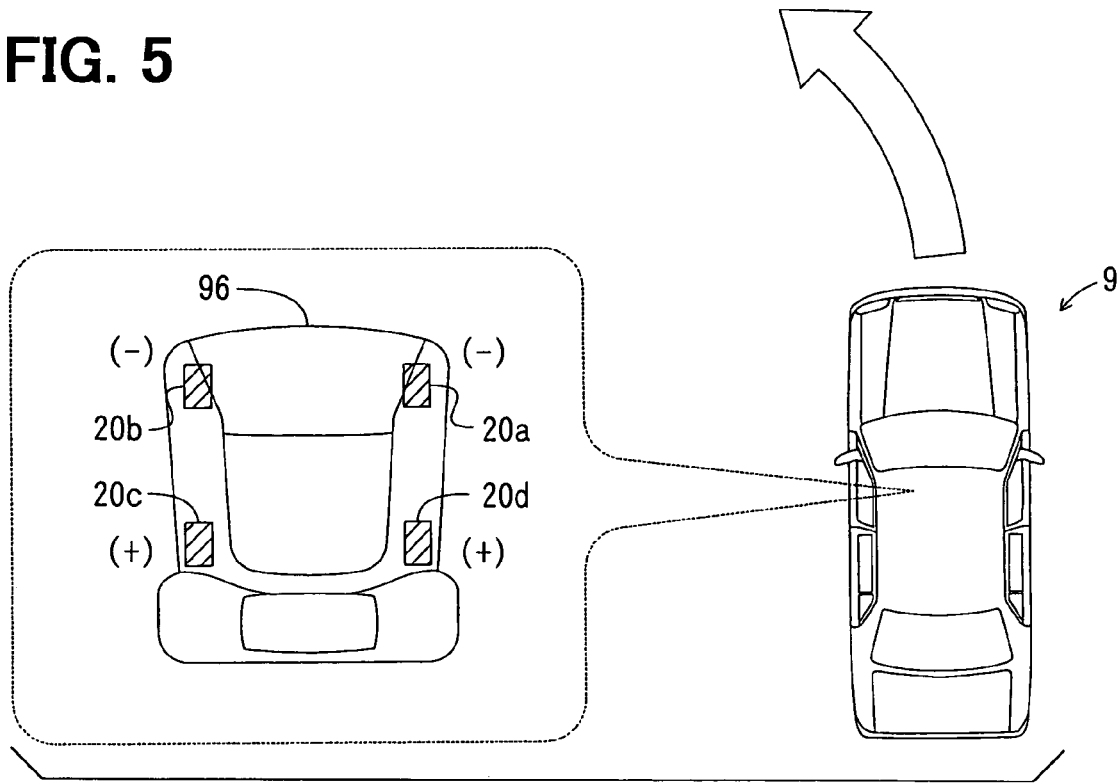
FIG. 5 is a schematic diagram showing that a vehicle at which a passenger detection device is mounted is turned while being accelerated according to a second embodiment of the present invention.

Referring to FIG. 5, when the vehicle is turned while being accelerated, the load of the plus side is centralized at the load sensor 20d. Thus, the detection load of the load sensor 20d exceeds the upper limit (boundary value) of the calculation range, so that the part of the detection load which exceeds the calculation range is not used for the calculation of the load exerted at the seat 96. That is, the detection load of the load sensor 20d corresponds to the upper limit of the calculation range. Therefore, the detection accuracy can be maintained even when the load is patricianly centralized at the seat 96.

Moreover, the lower limit of the calculation range can be also used as the individual passenger detection threshold value.

Other Embodiment

Although the present invention has been fully described in connection with the preferred embodiments thereof with reference to the accompanying drawings, it is to be noted that various changes and modifications will become apparent to those skilled in the art.

For example, the judgment result of the passenger information can be also used for determining an activation of a seatbelt pretensioner device or the like.

Moreover, the calculation range of the passenger detection ECU 3 can be also memorized in the ROM 312 instead of the EEPROM 32, so that a mistaken elimination of the calculation range can be reduced.

Furthermore, the number of the load sensors mounted at the one seat is not limited to four.

Moreover, the calculation range can be also set to have different widths for the multiple load sensors. For example, the lower limit of the calculation range for the load sensors at the seat front portion can be lowered toward the minus side, and the upper limit of the calculation range for the load sensors at the seat rear portion can be heightened toward the plus side.

Such changes and modifications are to be understood as being in the scope of the present invention as defined by the appended claims.

What is claimed is:

1. A passenger detection device for a vehicle, the passenger detection device comprising:

a plurality of load sensors, each of which detects a load on a seat of the vehicle within a predetermined detection range of the load sensor; and an ECU that determines passenger information of the seat, wherein:

the ECU has at least one calculation range, which limits the detection range of a corresponding one of the plurality of load sensors and is based on a vacancy zero point of the corresponding one of the load sensors;

the ECU determines the passenger information based on a detection data value of each load sensor, which is outputted from the load sensor and falls within the corresponding calculation range of the load sensor; and the calculation range is set to have a predetermined width from a plus side of the vacancy zero point of the corresponding one of the plurality of load sensors to a minus side thereof.

2. The passenger detection device according to claim 1, wherein the at least one calculation range of the ECU includes at least two kinds of calculation ranges to correspond with a variation in the load applied to the respective load sensors.

3. The passenger detection device according to claim 1, wherein:

the ECU has: at least one total passenger detection threshold value, each of which is compared with a total of the detection data values of the plurality of load sensors to determine the passenger information; and an individual passenger detection threshold value, which is compared with the detection data value of each load sensor to determine the passenger information; and the ECU uses previous passenger information, which has been previously determined based on the detection data value of each load sensor when the following two conditions are satisfied:

the total of the detection data values of the plurality of load sensors exceeds a corresponding one of the at least one total passenger detection threshold value; and the detection data value of at least one of the load sensors does not exceed the individual passenger detection threshold value.

4. The passenger detection device according to claim 3, wherein the individual passenger detection threshold value is a boundary value of the calculation range.

5. The passenger detection device according to claim 1, wherein the calculation range is smaller than the detection range.

6. The passenger detection device according to claim 3, wherein the individual passenger detection threshold value is based on the vacancy zero point of each load sensor.

* * * * *